United States Patent

[11] 3,523,544

| [72] | Inventor | Howard D. Hoffman |
| | | Fair Lawn, New Jersey |
| [21] | Appl. No. | 526,341 |
| [22] | Filed | Aug. 3, 1955 |
| [45] | Patented | Aug. 11, 1970 |
| [73] | Assignee | The United States of America as represented by the Secretary of the Army |

[54] ACCELERATION-SENSITIVE VALVE
4 Claims, 4 Drawing Figs.

[52] U.S. Cl. .................................................. 137/38, 137/48, 102/49.8, 244/3.22
[51] Int. Cl. ................................................... G05b, G05d
[50] Field of Search ........................................ 102/49, 50, 49.8; 244/3.22; 137/38, 48

[56] References Cited
UNITED STATES PATENTS
2,637,273  5/1953  Stokes .......................... 102/50

*Primary Examiner*— Samuel Feinberg
*Attorneys*— Harry M. Saragovitz, Edward J. Kelly and Herbert Berl 1. In an acceleration responsive valve for a self-propelled projectile, a valve body having a bore open at one end and terminating at its other end in a semi-circular channel extending transversely of the axis of said bore, there being a fuel passage opening into the bottom of said channel between its ends, a ball fitting said channel for rolling in and along the same, said ball obstructing the flow of fluid to said passage for one position thereof in and along said channel, a plug fixed in the end of said bore remote from said channel, and a pair of spring fingers secured at one end to said plug and spaced in the direction of said channel, said fingers at their free ends engaging said ball between them and urging the same to position in said channel forwardly of said opening in the direction of travel of the projectile.

Patented Aug. 11, 1970
3,523,544
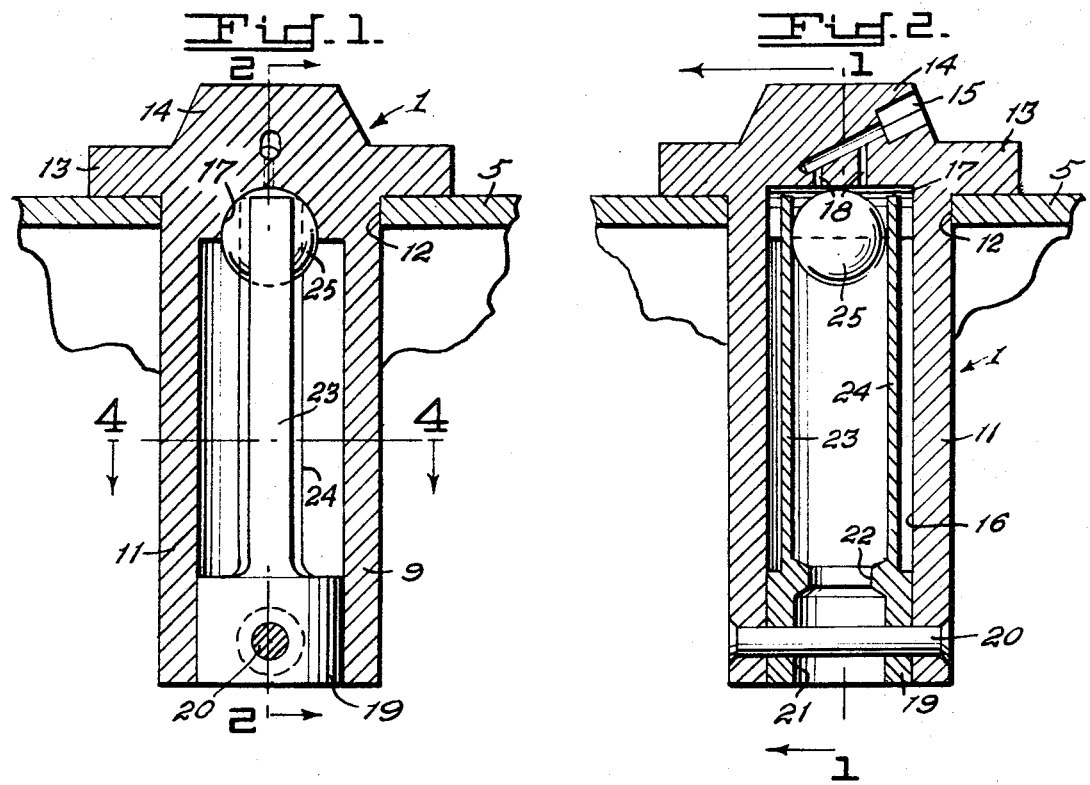
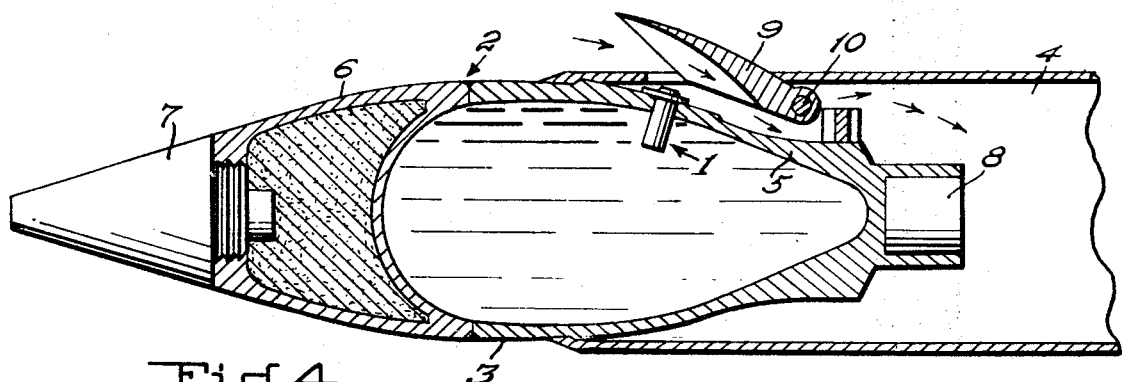
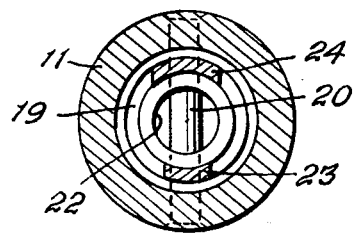
INVENTOR.
Howard D. Hoffman
BY
W. E. Thibodeau & A. W. Dew
ATTORNEYS

ACCELERATION-SENSITIVE VALVE

This invention relates to an acceleration sensitive valve and more particularly to a valve designed to control the acceleration of a jet-type projectile in flight by metering the flow of fuel from the fuel chamber to the combustion chamber in response to the acceleration. The valve of the present invention is designed for use with a spin-stabilized telescoping projectile and consists of a steel ball serving as the acceleration sensing element and fuel flow throttle. The ball, under centrifugal force, is received in a short semi-cylindrical channel extending parallel with the direction of flight, and is urged into maximum flow position centrally of the channel by a pair of leaf springs. Two small, parallel holes opening into the channel and spaced in the direction of flight, place the channel in communication with a fuel nozzle and thence with the combustion chamber. The resistance to the fuel flow of fuel through the two holes in parallel, in combination with the nozzle thus meters the fuel flow rate from the fuel chamber to the combustion chamber. Thus the flow rate of fuel may be changed between minimum and maximum depending upon whether the acceleration is above or below a desired or predetermined value. At steady state acceleration, the ball will be at rest partially throttling the rearward metering hole at a value of projectile acceleration dependent upon ball mass and leaf spring forces. If the acceleration is excessive, the ball will move further rearwardly against leaf spring pressure and completely cover the rearward hole, reducing the flow of fuel and slowing down the acceleration by a corresponding reduction in thrust. Upon deceleration, the ball will be urged forward in its channel by spring 24 to a position medially of passageways 18 whereby both are uncovered, thus permitting a maximum flow of fuel therethrough. When ball 25 is in its rearward position completely covering the rearward passageway 18, minimum flow occurs. Minimum flow is designed to be in the order of 80% of the maximum flow.

It is therefore the principal object of the invention to provide a valve actuated by the acceleration of a projectile to control the rate of fuel flow to the combustion chamber of the projectile and thereby maintain the acceleration within close limits.

It is another object of the invention to provide a valve simple of construction yet highly dependable of operation and one which is economically constructed.

The specific nature of the invention as well as other objects and advantages thereof, will clearly appear from a description of a preferred embodiment as shown in the accompanying drawing in which:

FIGURE 1 is a vertical sectional view of a valve constructed in accordance with the invention, taken in a plane identified by line 1-1, FIGURE 2.

FIGURE 2 is a vertical sectional view taken along line 2-2 of FIGURE 1 and looking in the direction of the arrows, FIGURE 3 is a longitudinal section of a projectile and illustrating one valve of the invention as applied thereto, and, FIGURE 4 is a cross sectional view taken along line 4-4 of FIGURE 1 and looking in the direction of the arrows.

Referring more particularly to the drawing, wherein like reference characters designate like or corresponding parts throughout the different views, reference character 1 designates generally a valve of the invention. 2 indicates generally a projectile of the telescoping type comprising a projectile body 3 and a combustion chamber 4. The projectile is illustrated in FIGURE 3 with its component parts in flight position.

Before firing, projectile 2 is normally telescoped into chamber 4 and upon launching the parts assume the position as shown in FIGURE 3. Essentially, the projectile assembly comprises a fuel tank 5, a warhead 6, a point-detonating fuze 7, an igniter element 8 and one or more air scoops 9 pivoted to the projectile body 3 and adapted to be projected to the open position shown upon FIGURE 3 from a collapsed position within chamber 4, by and in response to movement of the projectile parts into the extended position of FIGURE 3.

The valve 1 comprises a tubular member 11 adapted to fit in opening 12 in the fuel tank wall. Near the upper end of the tubular member 11 is an integral annular flange 13 to provide support for mounting the tubular member 11 to the wall of tank 5. The flange 13 may be welded to the wall 5 or united therewith by any other suitable means, not shown. At the uppermost extremity of the tubular member, a conical boss 14 is formed which provided a thickened portion for a bore 15 in which a fuel nozzle, not shown, may be secured as by threading. Bore 15 is disposed at a predetermined angle rearwardly and outwardly to the longitudinal axis of the tubular member 11. The tubular member 11 is provided with a central axial bore 16 and terminates in a channel 17 semi-circular in cross section and extending parallel with a diameter of bore 16 in the direction of travel of the projectile. As shown, the maximum length of the channel is equal to the diameter of the bore.

A pair of small holes 18 are spaced in the direction of extent of the channel on opposite sides of the axis of bore 16 and extend from the bottom of the channel to a bore 15 inclined at an acute angle outwardly and rearwardly with respect to the direction of flight. This bore is adapted to receive a fuel nozzle, not shown, as by a threaded connection.

A cylindrical plug 19 fits snugly within the inner end of bore 16 and is secured in position by a pin 20 passing through aligned holes in the walls of the plug and member 11. This plug has a central axial bore 22 counterbored at 21. A pair of diametrically positioned leaf spring members 23 and 24 extend outwardly from the end of plug 19 and, as shown, are formed integrally therewith. These spring members extend in parallel relation substantially the entire length of the bore in casing or housing 11 and terminate just short of the bottom of channel 17. From FIGURE 4 it will be noted that rearward spring member 24 is of greater width and strength than 23. The parts are so dimensioned that a ball 25 having the same radius as channel 17 is frictionally gripped by and between the spring members and normally held thereby in central position within the channel 17. From FIGURE 2 it is noted that, when in central position the ball leaves both bores 18 uncovered.

Initially, that is, before firing, the projectile is in collapsed condition, with unit 3 within chamber 4. When the projectile is fired, as from a rifled barrel, igniter 8 is activated and due to the centrifugal force generated by the spinning projectile, fuel in tank 5 is pressurized within member 11 and ball 25 is firmly seated centrally in channel 17. The firing pressure causes the projectile to extend and due to centrifugal force of the spinning projectile, air scoops 9 will open as soon as the projectile leaves the gun. Fuel is then discharged through the openings 15 due to centrifugal force and mixes with the air admitted through scoops 9 and is ignited. Pressure in combustion chamber 4 keeps the projectile in extended position during flight. Spring 24 being of greater strength than spring 23 is designed to receive the rearward thrust of ball 25 upon forward acceleration of the projectile. Spring 23 cooperates with spring 24 to support the ball 25 in its channel 17. The forward passageway 18 is intended always to be uncovered to permit a minimum flow of fuel at all times through the valve. Thus no excessive deceleration is normally permitted to slow down the projectile in its flight. The purpose of the valve is to be responsive to acceleration and therefore no excessive deceleration can occur when the ball 25 is in its central position in channel 17.

The valve 1 is so designed that when the projectile has the desired acceleration, the forward bore 18 (See FIG. 2) is entirely open and the rearward bore 18 is partly closed by the ball 25. If the projectile acceleration drops below the desired acceleration value, the ball 25 will move forward to uncover rearward bore 18, or should the projectile acceleration increase above the desired value, ball 25 will move rearward to partially or completely cover rearward bore 18, thereby causing more or less fuel to be supplied to the combustion chamber 4 with the result that the projectile thrust is increased or decreased to return the acceleration toward the desired value.

It is apparent that I have provided a valve sensitive to acceleration that is simple, economical, sturdy and positive of action. While I have shown the form of the invention now preferred by me, various modifications, substitutions and rearrangement of parts will occur to those skilled in the art after a study of the foregoing disclosure. Hence it is my desire and intention to reserve all such modifications within the scope of the subjoined claims. It will be understood, of course, that more than one valve 1 and its related air scoop may be provided in any given projectile arranged in equiangular positions about the longitudinal axis of the projectile to afford aerodynamic stability, and balance about such axis. The projectile herein disclosed forms the subject of a separate application in the names of Elia A. Gallo, Donald B. Clark and Edward W. Schwartz, Serial No. 674,549, filed July 19, 1957, for Telescoping Ram Jet Construction, Ordnance Corps Case No. 4339, Patent No. 2,935,946.

I claim:
1. In an acceleration responsive valve for a self-propelled projectile, a valve body having a bore open at one end and terminating at its other end in a semi-circular channel extending transversely of the axis of said bore, there being a fuel passage opening into the bottom of said channel between its ends, a ball fitting said channel for rolling in and along the same, said ball obstructing the flow of fluid to said passage for one position thereof in and along said channel, a plug fixed in the end of said bore remote from said channel, and a pair of spring fingers secured at one end to said plug and spaced in the direction of said channel, said fingers at their free ends engaging said ball between them and urging the same to position in said channel forwardly of said opening in the direction of travel of the projectile.

2. In an acceleration responsive control valve for the fuel feed of a self-propelled projectile, a valve body having a bore open at one end and terminating at the other end in a channel arcuate in cross section and extending parallel with a diameter of said bore, there being forward and rearward bores opening into said channel and spaced in the direction of said diameter, a ball rollably fitting said channel for movement into obstructing relation with said rearward bore, a plug secured in the free end of said bore, a pair of spring fingers fixed to said plug and spaced in the direction of said diameter, said fingers extending in and along said bore and engaging said ball between them at their free ends, said fingers urging said ball into a central position in said channel whereby said forward and rearward bores are unobstructed.

3. In an acceleration responsive valve for a projectile, a valve body having a bore open at one end and terminating at its other end in a semi-circular channel, said channel being disposed in the direction of a component acceleration of the projectile, there being forward and rearward passageways in said valve body opening into the bottom of said channel between its ends, a ball fitting said channel for guided rolling therein and a hollow plug axially secured within said valve body bore and adjacent the open end thereof, said plug defining a pair of leaf spring fingers extending outwardly in parallel relation from the end of said plug to terminate within said semi-circular channel and grip said ball in said channel, said ball adapted to move rearwardly in said channel upon increasing forward acceleration of said projectile to partially or completely cover said rearward passageway and upon deceleration of said projectile to move forwardly in said channel to position medially of said forward and rearward passageways whereby said forward and rearward passageways are uncovered.

4. An acceleration responsive control valve as recited in Claim 3, wherein one of said spring fingers adjacent said rearward bore has greater strength than the other of said spring fingers.